Jan. 18, 1927. 1,614,510
C. P. WICKS
SWITCH OR CIRCUIT CLOSER FOR AUTOMOBILES
Filed April 4, 1922 2 Sheets-Sheet 1

Inventor
C. P. Wicks
By Seymour & Bright
Attorneys

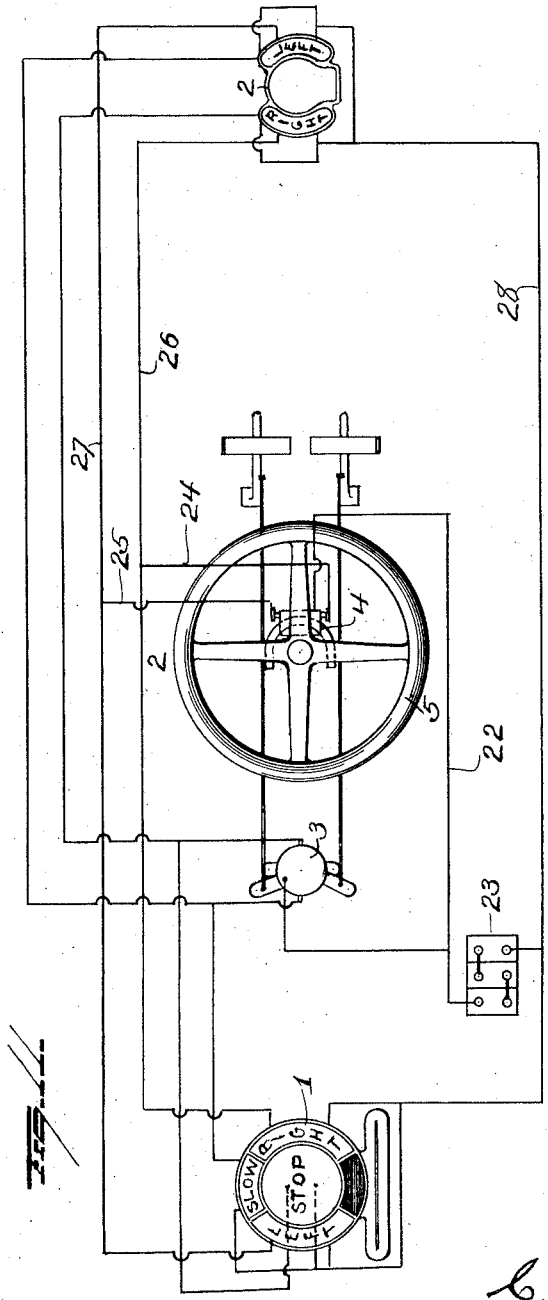

Patented Jan. 18, 1927.

1,614,510

UNITED STATES PATENT OFFICE.

CLIFFORD PROVOST WICKS, OF STAMFORD, CONNECTICUT.

SWITCH OR CIRCUIT CLOSER FOR AUTOMOBILES.

Application filed April 4, 1922. Serial No. 549,613.

This invention relates to improvements in signaling means for automobiles, and more particularly to an improved switch mechanism for controlling the operation of "direction" signals, one object of the invention being to provide an efficient switch mechanism for the purpose stated, which may be mounted in such location that it may be readily operated without removing the hand from the steering wheel.

A further object is to construct the switch mechanism in such manner as to provide simple and efficient release means for the purpose of returning the switch automatically to neutral position and thus prevent the vehicle from being driven a long distance with direction signals lighted in the event the operator neglects to extinguish them.

A further object is to provide simple and efficient manually operable means for causing the switch to return to normal or neutral position.

A further object is to so construct the switch that it may be operated by widely separated push buttons, so that the heaviest gloved hand or finger can quickly operate the switch without danger of error, and do so by the sense of touch alone.

With these and other objects in view, the invention consists in certain novel features of construction and combinations of parts as hereinafter set forth and pointed out in the claims.

In the accompanying drawings; Figure 1 is a view, partly broken away illustrating an embodiment of my invention; Figure 2 is a view taken at right angles to Figure 1; Figure 3 is a longitudinal sectional view of the switch on the line 3—3 of Figure 4; Figure 4 is a sectional view on the line 4—4 Figure 2; Figure 5 is a transverse sectional view on the line 5—5 of Figure 4; Figure 6 is a transverse sectional view on the line 6—6 of Figure 4; Figure 7 is a view showing the cover of the switch casing; Figure 8 illustrates the block carrying the binding posts and contact points; Figure 9 is a separate view of the switch slide and parts carried thereby; Figure 10 illustrates the release plunger, and Figure 11 is a diagrammatical view showing an embodiment of my improvements in an electrical signaling system for an automobile.

In Figure 11 of the drawings, I have illustrated a rear signal 1 to be illuminated by incandescent electric lamps and having direction signals designated as "Right" and "Left" and speed signals designated as "Slow" and "Stop", and I have also shown a front signal 2 which may be mounted on the radiator cap of an automobile, and having direction signals designated as "Right" and "Left". In the diagrammatical view, a "speed" switch is shown at 3 for controlling the rear "speed" signals and a "direction" switch 4 is also shown carried by the steering column and controllable by the operation of the steering wheel 5. It is to this last mentioned switch and its operating means that my present invention more particularly relates, and the construction and operation of the same will now be described.

The said switch mechanism is carried by a casing 6 provided with a cover 7 (secured in place by a screw 7$^a$ passing through the casing and its cover) and said casing may be supported by the steering column 8 of an automobile through the medium of a bracket 9 secured to said casing and connected with said steering column by means of a clamp 10.

An insulating support 11 is secured by a screw 12 in the casing and carries a plurality of binding posts at 13, 14 and 15, with which strands or wires of a cable 16$^a$ are connected, said cable passing through a hole 7$^b$ in the cover 7. The support or block 11 also carries a series of three contact points 16, 17 and 18, the central one (16) of which is connected by a conductor 19 with the binding post at 13, while the contact points 17 and 18 are connected by conductors 20 and 21 respectively with the binding posts at 14 and 15, and the several conductors 19, 20 and 21 may be carried in the insulating support 11 as indicated in Figures 3, 4, 6 and 8. The cable includes a conductor 22 which is electrically connected with the binding post at 13 and with the positive terminal of a battery 23, and said cable also includes conductors 24, 25, electrically connected with the binding posts at 15 and 14 respectively. The conductors 24 and 25 are connected with conductors 26 and 27 and the latter are connected, respectively, with the right and left direction signal lamps of the respective front and rear signals 2 and 1—said lamps being also connected with a return conductor 28, the latter being connected with the negative terminal of the battery 23.

Located within the casing 6 is a slide 29 provided at its respective ends with ears 30 to which rods or stems 31, 32 are secured. These rods or stems pass freely through suitable holes in the respective ends of the casing 6 and are provided with knobs 33 and 34 respectively. The slide 29 carries a contact finger 35, (insulated from said slide as indicated at 36) the upper end of which forms an elongated head 37 sufficient in length to bridge the contacts 16–18 or 16–17 when the slide is moved in one direction or the other from its normal or neutral position. A spring 38 is coiled between its ends on a pin 39 carried by the cover 7, and its two normally parallel members are maintained separated by a lug 40 entering between them, said lug being integral with a flange 41 rigid with the cover 7, and said flange serves to assist in guiding the spring members when they are moved. The slide 29 is provided with a flange 42 provided at its edge with a lug 43 which enters between the members of the spring 38 and those portions of the flange 42 at respective sides of the lug 43, cooperates with the flange 41 at respective sides of the lug 40 in guiding the movements of the members of the spring 38.

From the construction and arrangement of parts as above described, it is apparent that when the knob 33 at one end of the casing (this end of the casing being designated "Right" as shown in Figure 1) is depressed, the slide 29 will be moved against the resistance of one member of the spring 38, and the contact finger 35 will be so moved that its head 37 will electrically connect the contacts 16 and 18 and thus the lamps of the direction signals indicating a right hand turn, in both the front and rear signals will be lighted. Should the slide be moved from its neutral position in the reverse direction by depressing the knob 34 at the opposite end of the casing (this end of the casing being designated "Left"), the head 37 of the contact finger 35 will electrically connect the contact points 16 and 17, and the lamps of the front and rear signals indicating a left hand turn will be lighted.

It is desirable that the switch shall be locked in a shifted position when shifted to light one set or the other of the direction signals, but that it shall be released and returned to neutral position, thus causing the signal lights to be extinguished when the steering wheel is turned to cause the vehicle to commence to travel upon a circle, and also that manually operable means be provided whereby the switch slide may be caused to return to neutral position to extinguish direction signals in case of error in the operation of the push buttons or the failure of the turn to automatically operate the release plunger. To accomplish these results, the devices now to be described are employed.

A release plunger 44 passes transversely through the casing 6 and its cover. The body portion of this plunger is angular in cross section and one end portion thereof after passing through the cover 7, enters a cap 45 secured to said cover, and the other end portion of said plunger is in the form of a cylindrical push button 46 which passes freely through and beyond the opposite wall of the casing and through the block or support 11. The plunger 44 is maintained in its normal position with the push button portion 46 thereof projected beyond the casing, by means of a spring 47 housed in a bore 48 in the plunger and bearing against the inner side of the cap 45. Adjacent to the juncture of the body portion of the plunger and the cylindrical button portion 46 thereof, a recess 49 is formed and adjacent to the recess, the plunger is made with oppositely disposed beveled faces 50. Normally, a lug 51 on the switch slide 29 enters the recess 49 in the plunger and thus the latter is held in normal retracted position against the tension of the spring 47. The slide 29 may be supported by a guide lug 52 projecting from the casing and passing through an opening in the insulating block or contact support 11, so as to engage said slide.

A segment 53 is secured to two spokes of the steering wheel 5 by means of clamps such as indicated at 54, and at diametrically opposite positions, the segment 53 is provided with cams 55. A finger lever 56 is pivoted at one end to the segment 53 and is provided with a cam 57 in position to engage the end 46 of the release plunger when the plunger is in projected position and when said lever is depressed by the operator. The finger lever 56 is maintained normally in a retracted position by the action of a spring 58 and a finger 59 on said lever engages a stop lug 60 on the segment.

It will be seen that when the slide shall have been moved in one direction or the other to close the circuits of direction signal lamps, as previously explained, the lug 51 will move out of the recess 49 in the release plunger and said plunger will at once be projected by the action of the spring 47, when one of the beveled faces 50 on the plunger will become disposed in the path of the lug 51 and thus prevent the spring 38 from returning the slide to normal position. One or the other set of direction signal lamps will remain lighted as long as the switch slide is held as above described, in its shifted position, but when the operator turns the steering wheel to cause the vehicle to travel upon a curve, one or the other of the cams 55 on the segment 53 will engage the release plunger and depress it, thus bringing the recess 49 in line with the lug 51 on the slide 29 and permitting the spring 38 to return the slide to neutral position (as shown in Figure 4) and causing the signal circuit to be opened and the signal lamps extinguished.

In case of error in the operation of the push button or failure of the turn to automatically operate the release plunger, the operator may, by operating the finger lever 56, cause the cam 57 to engage the projected release plunger and thus effect the return of the slide to neutral position and the extinguishing of the signal lamps.

Various changes might be made in the details of construction of my invention without departing from the spirit thereof or limiting its scope and hence I do not restrict myself to the precise details herein set forth.

Having fully described my invention what I claim as new and desire to secure by Letters-Patent, is:—

1. In a signal device for automobiles, the combination of a direction switch to be carried by the steering column and including a frame or casing, manually operable means at respective ends of said casing for shifting said switch, locking means for holding the switch in shifted position, and means to be carried by the steering wheel and operable automatically to operate said locking means to release the switch and permit it to return to neutral position.

2. In a signal device for automobiles, the combination of a direction switch including a frame or casing to be supported by the steering column, means whereby the switch may be manually operated, locking means for the switch, cams supported by the steering wheel for releasing said locking means when the steering wheel is turned in one direction or the other in steering the automobile, and means for holding the movable member of the switch in and returning it to a neutral position.

3. In a signal device for automobiles, the combination with switch mechanism including a frame or casing to be secured to the steering column, a manually operable slide carrying a contact finger, contact points to be engaged by said contact finger, means for locking said slide in shifted position, a member to be carried by the steering wheel and provided with diametrically opposite cams for operating the locking means to release the slide, and means for returning the slide to and maintaining it in a neutral position.

4. In a signal device for automobiles, the combination with switch mechanism including a frame or casing to be secured to the steering column, a manually operable slide carrying a contact finger, contact points to be engaged by said contact finger, means for locking said slide in shifted position, a member to be carried by the steering wheel and provided with diametrically opposite cams for operating the locking means to release the slide, means for returning the slide to and maintaining it in a neutral position, and a manually operable device carried by said member and provided with a cam to operate said locking means to release the slide.

5. In a signal device for automobiles, the combination of a switch mechanism to be carried by the steering column, means whereby the switch may be manually shifted, locking means for holding the switch in shifted position, a segment to be secured to the steering wheel, diametrically opposite cams on said segment to operate the locking means and permit the switch to return to neutral position, and means for returning the switch to and maintaining it normally in neutral position.

6. In a switch mechanism of the character described, the combination with a casing and a plurality of contact points therein, of a switch slide in said casing and having a contact finger for cooperation with said contact points, manually operable devices secured to said slide and projecting beyond respective ends of said casing, a locking plunger mounted transversely in the casing and projecting beyond a wall thereof, said plunger having a notch and said slide having a lug to enter said notch, a spring for holding the slide in neutral position with the lug thereon in the notch in the plunger and returning the latter to neutral position, and a spring tending normally to force the plunger outwardly, whereby the plunger will be projected when the slide is shifted and engage the lug on said slide to lock the latter against return to normal position until the plunger shall have been depressed.

In testimony whereof, I have signed this specification.

CLIFFORD PROVOST WICKS.